United States Patent [19]
Guerci

[11] Patent Number: 5,381,154
[45] Date of Patent: Jan. 10, 1995

[54] OPTIMUM MATCHED ILLUMINATION-RECEPTION RADAR FOR TARGET CLASSIFICATION

[76] Inventor: Joseph R. Guerci, 21-02 Ditmas Blvd., Astoria, N.Y. 11105

[21] Appl. No.: 115,691

[22] Filed: Sep. 3, 1993

[51] Int. Cl.⁶ .......................................... G01S 13/56
[52] U.S. Cl. .................................. 342/90; 342/204; 342/83
[58] Field of Search .................... 342/90, 204, 83

[56] References Cited

U.S. PATENT DOCUMENTS

| | | | |
|---|---|---|---|
| 4,992,797 | 2/1991 | Gjessing et al. | 342/192 |
| 5,121,125 | 6/1992 | Guerci et al. | 342/204 |
| 5,146,229 | 9/1992 | Guerci et al. | 342/204 |
| 5,175,552 | 12/1992 | Guerci et al. | 342/82 |

*Primary Examiner*—Gilberto Barrón, Jr.
*Attorney, Agent, or Firm*—Pollock, Vande Sande & Priddy

[57] ABSTRACT

A bank of matched filters are employed to impose on a transmitted pulse, as well as the optimum matched filter receiver response, exact amplitude and phase modulations necessary to maximize the likelihood of accurate target identification. This is accomplished by subjecting the output of each matched filter (corresponding to a target signature) to a threshold level detector to eliminate identification outputs caused solely by noise. The outputs from the threshold device represents the target identification from each matched filter. Since each matched filter corresponds to a particular target, the highest output identification signal will indicate the presence of a corresponding target.

2 Claims, 2 Drawing Sheets $H(\omega) = H_1(\omega) - H_2(\omega)$

OPTIMUM MATCHED ILLUMINATION-RECEPTION RADAR FOR TARGET CLASSIFICATION

FIELD OF THE INVENTION

The present invention relates generally to radar detection and identification of a target, and more specifically, to ground-to-air or air-to-air radar detection and identification of targets using matched filters.

BACKGROUND OF THE INVENTION

The state of the art of detecting low observable aircraft or other targets using radar has not advanced as quickly as the aircrafts themselves and their ability to evade detection. Detection to date had been limited in the type and character of modulation that could be applied to a transmitted signal. For example, the transmitters were incapable of applying arbitrary amplitude and phase modulation. With the advent of linear amplifiers, however, arbitrary amplitude and phase modulation is possible.

The design in U.S. Pat. 5,175,552, issued Dec. 29, 1993, takes advantage of the advances in radar transmission technology by maximizing the S/N ratio of the received echo. A transfer function $H_1(\omega)$ is first determined from characteristics that are completely described by the impulse response of the target. Transfer function $H_1(\omega)$ of the target is then applied to the transmitted signal s(t) to give y(t), the echo signal directly from the target.

After adding signals representing noise and clutter inherent to the system, a received echo r(t) is modulated by a second transfer function $H_2(\omega)$, at the receiver (representative of a receiver), giving us g(t), the finally-received signal. The highest S/N ratio is realized when $H_2(\omega)=kY^*(\omega)$, which describes a matched filter in the white noise case. Under this condition, $S/N = 2E/N_0$, so that the S/N ratio is maximized when echo response energy E is maximized.

Energy E is maximized when s(t) is chosen so that $$E = \int |y(\tau)|^2 d\tau \tag{1}$$

subject to the constraints $$s(t) = 0 \text{ for } t \in [0 < t < T] \text{ and} \tag{2}$$

$$E_{in} = \int s(\tau)^2 d\tau < \infty \tag{3}$$

Solving by the Calculus of Variations gives $$s(t) = \mu \int s(\tau) \gamma(t,\tau) d\tau \tag{4}$$

where $$\gamma(t,\tau) = \int h_1(\lambda-t) h_1(\lambda-\tau) d\lambda \tag{5}$$

where $h_1$ is the impulse response of the target and the Fourier transform of $H_1(\omega)$.

Transfer function considerations as just outlined are important in the previous approach—in order to achieve enhanced detection of a response signal from a target. However, it is extremely important to improve upon this prior approach by enhancing the target identification or classification capabilities of a radar signal.

BRIEF DESCRIPTION OF THE PRESENT INVENTION

Consider the situation in which a radar has established a track (range, speed, heading, altitude) but is unable to identify what type of object it is (e.g. an aircraft). In the case of an airborne target this may occur because the aircraft is hostile (and therefore does not wish to be identified) or because a communications link between the aircraft and radar cannot be established. In this situation, it is desirable to be able to classify the target by attempting to associate the observed radar echo responses with a library of known target-echo signatures. Some existing techniques compare the doppler spectra of target echoes with a reference library in order to effect classification.

The current invention goes a step beyond these prior techniques by optimizing not only the transmitted radar pulse (amplitude and phase modulation) as discussed in connection with the discussed previous technique of enhanced detection; but also by optimizing the receiver characteristics. This is done by extending the utilization of optimum matched filters to not only optimize the detection of a radar object, but also to the task of classifying it. In the embodiment disclosed, a two target case is discussed but the approach can be extended to the n-target case.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

This invention is concerned with determining the "best" transmitter-receiver configuration for a radar (either airborne or ground based) which will provide for optimum target classification.

Figure 1:
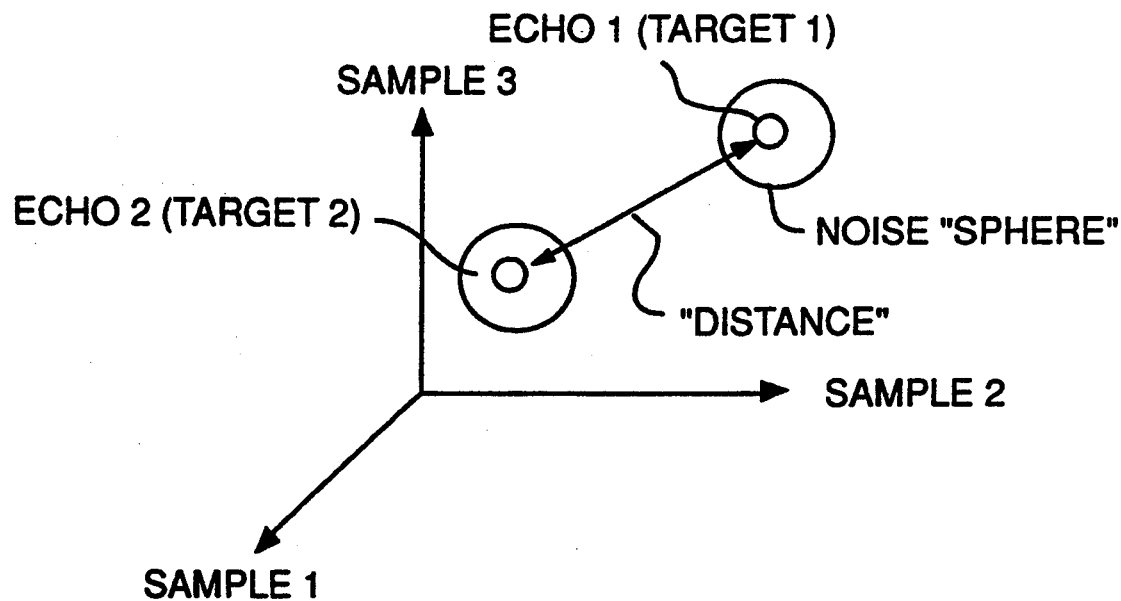
FIG. 1 is a three axis plot of distances between radar echoes.

Consider the problem of choosing a transmittal waveform s(t), which represents the complex envelope of a band limited signal of some center frequency $w_c$, such that the echo responses from two different targets $y_1(t)$ and $y_2(t)$ are as different as possible in the sense that $$\int_{T_i}^{T_f} |y_1(t) - y_2(t)|^2 dt \tag{6}$$

is maximized, over some observation interval $T_i$ to $T_f$ subject to the constraint that s(t) is of finite duration (pulse) T. The rationale for Eq. 6 above is depicted in FIG. 1, where the echo responses $y_1(t)$ and $y_2(t)$ are illustrated as "spheres," due to the additive noise, inherently present in any real world radar, in some received signal space. For example, the signal space could represent down-converted I and Q video time samples of $y_1(t)$ and $y_2(t)$ in which case the axes corresponding to different time sampling instants (in FIG. 1 there are three samples). From information theoretic arguments if one wishes to optimally distinguish between these two echoes, then one should choose a transmitted waveform s(t) which maximizes the separation or "distance" between these two spheres (which in turn maximizes the separation of their respective probability density functions (pdf). The square of this distance is given by Eq. 6. Thus the objective is to maximize s(t) subject to the finite energy constraint:

$$\int_0^T |s(t)|^2 dt < \infty \quad (7)$$

Figure 2:
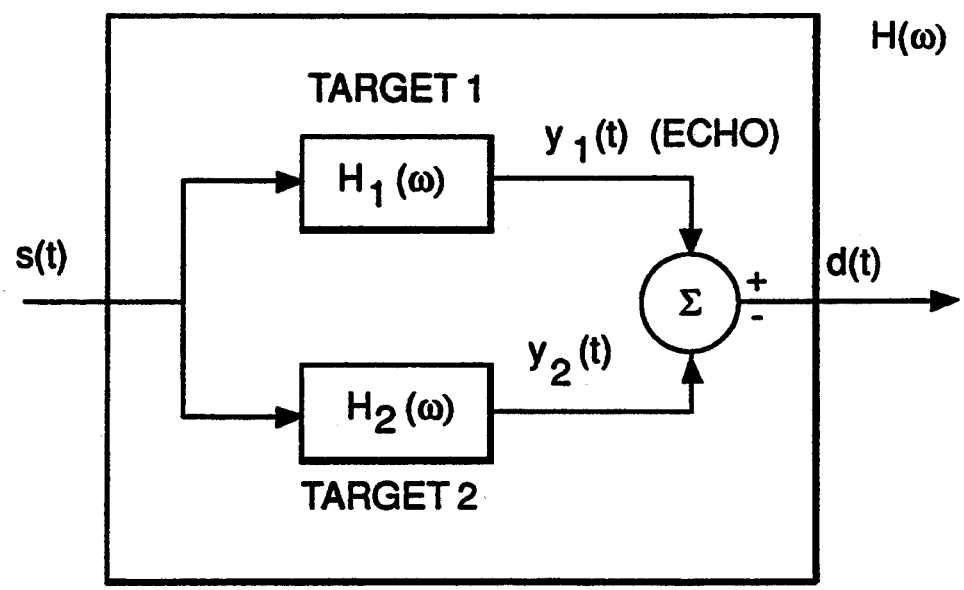
FIG. 2 is a block diagram of a two-target optimal probing signal designed in accordance with the present invention.

The solution to this problem is greatly facilitated by referring to FIG. 2 where it is shown that the aforementioned optimization problem is equivalent to the problem of maximizing the energy in the echo d(t) $\Delta y_1(t) - y_2(t)$ of a linear system with transfer function $$H(\omega) = H_1(\omega) - H_2(\omega) \quad (8)$$

subject to equation (7), where $H_1(\omega)$ and $H_2(\omega)$ are the respective transfer functions of the two targets. This problem, however, has been previously solved, as mentioned. The solution is given by that s(t) with the smallest associated Eigenvalue ($\mu$) of $$s(t) = \mu \int_0^T s(\tau)\gamma(t,\tau)dt \quad (9)$$

where $$\gamma(t,\tau) \triangleq \int_{T_i}^{T_f} h(\lambda - t)h^*(\lambda - \tau)d\lambda \quad (10)$$

where h(t) is the band limited impulse response of the system $$H(\omega) = H_1(\omega) - H_2(\omega) \quad (11)$$

The present invention recognizes that for an optimal receiver for a two target case, a bank of two matched filters are is used; one matched to $y_1(t)$ and the other to $y_2(t)$. A decision as to which target is present is based on which matched filter produces the largest response from the optimized s(t) signal.

This inventive procedure can be extended to the n-target case by dividing the n-target into a series of binary classes. For example, the first branch in a tree might consist of the two classes "missiles or planes"; the second upper branch might consist of "big or small planes", while the second lower branch would similarly consist of "big or small missiles." One would continue on in this fashion, applying the current invention at each decision mode, until the requisite level of classification has been achieved.

Figure 3:
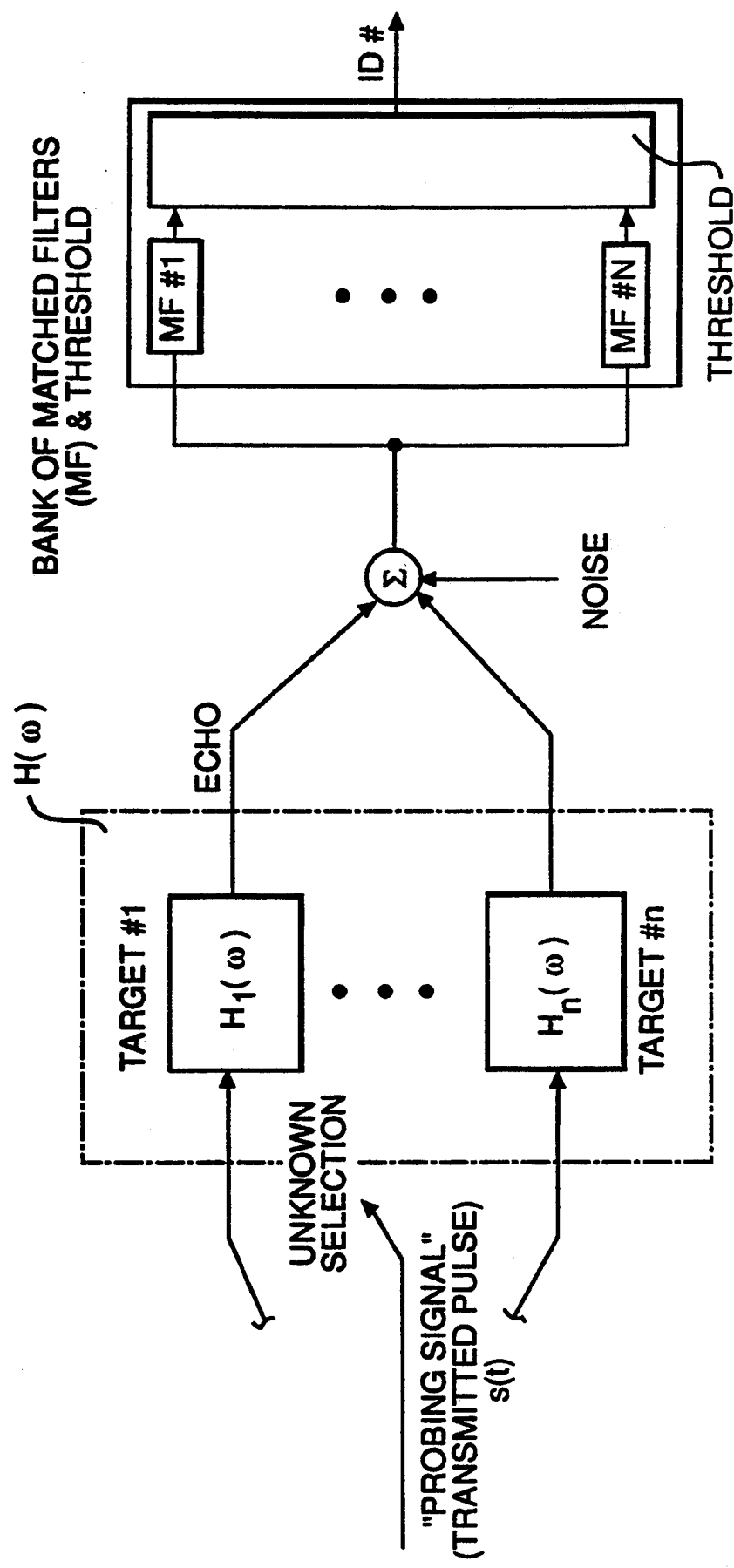
FIG. 3 is a block diagram of a bank of matched filters and threshold detectors as employed in the present invention.

FIG. 3 is a block diagram illustrating a system for the present invention with n-targets. The transmitted signal s(t) will of course be reflected from remote targets, the indicated number of remote targets being n. Since each target presents its unique transfer function or signature to the transmitted signal, unique echo signals are of course reflected back to the receiver. In accordance with a previous solution, the transmitted signal is chosen so as to prescribe an exact amplitude and phase modulation which will cooperate with optimum matched filters in a manner maximizing the detection of targets. In accordance with the present invention, a bank of matched filters are likewise employed to impose on the transmitted pulse, as well as the optimum matched filter receiver response, exact amplitude and phase modulations necessary to maximize the likelihood of accurate target identification. In FIG. 3, this is accomplished by subjecting the output of each matched filter (corresponding to a target signature) to a threshold level detector to eliminate identification outputs caused solely by noise. The output from the threshold devices represents the target identification from each matched filter. Since each matched filter corresponds to a particular target, the highest output identification signal will indicate the presence of a corresponding target.

It should be understood that the invention is not limited to the exact details of construction shown and described herein for obvious modifications will occur to persons skilled in the art.

I claim:

1. A system for detecting and classifying a target by transmitting a radar signal toward the target, and receiving a radar signal echoed back from the target, comprising:

means for transmitting an illumination waveform s(t) towards the target responsive to a transmitted signal;

means for receiving an echo signal from the target;

signal optimizing means for optimizing s(t) according to the equation $$s(t) = \mu \int_0^T s(\tau)\gamma(t,\tau)dt$$

where $\mu$ is an Eigenvalue solution of the integral, $\tau$ is a dummy variable of integration representing the time over which s(t) interacts with the target, and $\gamma$ is the autocorrelation function of the impulse response of the target;

a plurality of matched filter means, each of which is matched to a particular target, responsive to the echo signal for generating identification signals of different intensity;

the identification signal of maximum intensity being indicative of a detected target.

2. The system set forth in claim 1 together with threshold detecting means connected to the matched filter means for suppressing identification signals below a preselected intensity.

* * * * *